(12) United States Patent
Chon et al.

(10) Patent No.: US 8,778,289 B2
(45) Date of Patent: Jul. 15, 2014

(54) METHOD FOR ECONOMICAL EXTRACTION OF LITHIUM FROM SOLUTION INCLUDING LITHIUM

(71) Applicant: Research Institute of Industrial Science & Technology, Pohang (KR)

(72) Inventors: Uong Chon, Pohang-si (KR); Oh Joon Kwon, Pohang-si (KR); Ki Hong Kim, Pohang-si (KR); Chang Ho Song, Incheon (KR); Gi Chun Han, Cheongju-si (KR); Ki Young Kim, Yongin-si (KR)

(73) Assignee: Research Institute of Industrial Science & Technology, Pohang (KR)

( * ) Notice: Subject to any disclaimer, the term of this patent is extended or adjusted under 35 U.S.C. 154(b) by 0 days.

(21) Appl. No.: 13/736,143

(22) Filed: Jan. 8, 2013

(65) Prior Publication Data
US 2013/0129586 A1    May 23, 2013

Related U.S. Application Data

(63) Continuation of application No. PCT/KR2011/005026, filed on Jul. 8, 2011.

(30) Foreign Application Priority Data

Jul. 9, 2010 (KR) .......... 10-2010-0066391
Dec. 7, 2010 (KR) .......... 10-2010-0124089

(51) Int. Cl.
*C22B 7/00* (2006.01)
(52) U.S. Cl.
USPC ........ 423/179.5; 423/164; 423/165; 423/276; 423/312; 423/313

(58) Field of Classification Search
USPC .............. 423/164, 165, 179.5, 276, 312, 313
See application file for complete search history.

(56) References Cited

U.S. PATENT DOCUMENTS

| 6,207,126 | B1 | 3/2001 | Boryta | |
|---|---|---|---|---|
| 2009/0214414 | A1 | 8/2009 | Boryta et al. | |
| 2011/0044882 | A1* | 2/2011 | Buckley et al. | 423/481 |
| 2011/0300041 | A1* | 12/2011 | Galli et al. | 423/179.5 |
| 2013/0146476 | A1* | 6/2013 | Chon et al. | 205/770 |

FOREIGN PATENT DOCUMENTS

| CN | 1424980 | 6/2003 |
|---|---|---|
| CN | 101508450 | 8/2009 |
| JP | 11-265737 | 9/1999 |
| JP | 2004-359538 | 12/2004 |
| JP | 2006-057142 | 3/2006 |
| JP | 2007-122885 | 5/2007 |
| JP | 2008-066019 | 3/2008 |
| WO | 2009/096795 | 8/2009 |

OTHER PUBLICATIONS

Jianjun Yuan, et al., "Study on the Adsorption of Magnesium Hydroxide to Boron in Seawater and the Removal of Boron in Brine", Journal of Salt and Chemical Industry, vol. 36, Iss. 1, pp. 1-2 (Jan. 2007).

* cited by examiner

*Primary Examiner* — Steven Bos
(74) *Attorney, Agent, or Firm* — Lexyoume IP Meister, PLLC

(57) ABSTRACT

The present invention relates to a method of extracting lithium from a lithium bearing solution. More specifically, the present invention provides a method of economical extraction of lithium from a lithium bearing solution by adding a phosphorous supplying material to the solution to precipitate lithium phosphate from the dissolved lithium.

15 Claims, 8 Drawing Sheets

US 8,778,289 B2

METHOD FOR ECONOMICAL EXTRACTION OF LITHIUM FROM SOLUTION INCLUDING LITHIUM

CROSS-REFERENCE TO RELATED APPLICATIONS

This application is a continuation of pending International Application No. PCT/KR2011/005026 filed on Jul. 8, 2011, which claims priority to Korean Patent Application No. 10-2010-0066391, filed on Jul. 9, 2010, and Korean Patent Application No. 10-2010-0124089, filed on Dec. 7, 2010, the entire contents of each which are incorporated herein by reference.

FIELD OF THE INVENTION

The present invention relates to a method of extracting lithium from a lithium bearing solution.

BACKGROUND OF THE INVENTION

The application of lithium currently extends to diverse industries, including the rechargeable battery, glass, ceramic, alloy, lubricant, and pharmaceutical industries. The lithium rechargeable battery has recently been receiving attention as a main power source for hybrid and electric cars, and the market for lithium rechargeable batteries for cars is expected to continue growing to approximately one-hundred times the conventional compact battery markets for cell phones and notebooks.

In addition, a global movement towards more stringent environmental regulations is likely to expand the application of lithium to not only the hybrid and electric car industries, but to the electrical, chemical and energy fields as well. Thus, a dramatic increase of both domestic and foreign demand for lithium is expected.

The main sources for the lithium could be minerals, brine and seawater. Although minerals such as spodumene, petalite and lepidolite contain relatively large amounts of lithium, ranging from approximately 1 to 1.5%, the extraction involves complicated processes such as floatation, calcining at a high temperature, grinding, acid mixing, extraction, purification, concentration and precipitation. These processes, require high energy consumption, are considered to be cost-ineffective, and the use of acids during the lithium extraction also causes environmental pollution.

It has been reported that approximately $2.5 \times 10^{11}$ tons of lithium is dissolved in seawater. Although the majority of technologies involve inserting an extraction device containing an absorbent into the seawater in order to extract lithium by treating with acids after selectively absorbing the lithium, it is extremely inefficient and uneconomical to directly extract the lithium from seawater because the concentration of lithium contained in the seawater is limited to 0.17 ppm.

Due to the aforementioned disadvantages, lithium is currently extracted from brine produced from natural salt lakes, but salts such as Mg, Ca, B, Na, K, $SO_4$ are also dissolved in the brine.

Further, the concentration of lithium contained in the brine ranges from approximately 0.3 to 1.5 g/L, and lithium contained in the brine is usually extracted in the form of lithium carbonate having a solubility of about 13 g/L. Even assuming that lithium contained in the brine is completely converted to lithium carbonate, the concentration of lithium carbonate in the brine is limited to 1.59 to 7.95 g/L (the molecular weight of $Li_2CO_3$ is 74, and the atomic weight of Li is 7. If the concentration of lithium is multiplied by 5.3 ($74 \div 14 \approx 5.3$), the concentration of lithium carbonate can be estimated). Since most of the lithium carbonate concentration is lower than the solubility of lithium carbonate, the extracted lithium carbonate re-dissolves, and thus there is a problem of the lithium extraction yield being extremely low.

Traditionally, in order to extract lithium carbonate from lithium contained in brine, the brine pumped from the natural salt lake was stored in evaporation ponds and subsequently naturally evaporated outdoors over a long period of time, for instance about one year, to concentrate the lithium by several tenfold. Then, the impurities such as magnesium, calcium, boron were precipitated in order to be removed, and the method required an amount greater than the solubility of lithium carbonate to precipitate.

For instance, Chinese Patent Pub. No. 1,626,443 describes a method of extracting lithium, wherein brine is evaporated and concentrated under solar heat, and the concentrate is subject to repeated electro-dialysis in order to obtain brine containing concentrated lithium with a low amount of magnesium.

Such conventional methods require the evaporation and concentration of the brine, which are time-consuming and unproductive, especially during rainy seasons. Further, the loss of lithium is unavoidable when lithium is precipitated along with other impurities in the form of a salt.

SUMMARY OF THE INVENTION

In accordance with an embodiment of the present invention, a method of economical extraction of high purity lithium phosphate with high extraction yield from brine, which does not require the processes of evaporation and concentration of the brine for a long period of time, by using lithium phosphate having low solubility may be provided.

In accordance with an embodiment of the present invention, a method of economical extraction of lithium from a lithium bearing solution by adding a phosphorus supplying material to the solution to precipitate lithium phosphate from the dissolved lithium is provided.

In one embodiment of the present invention, the phosphorus supplying material may be one selected from the group consisting of phosphorus, phosphoric acid, phosphate and a mixture thereof.

In one embodiment of the present invention, the concentration of the lithium phosphate may be 0.39 g/L or more.

In one embodiment of the present invention, the concentration of lithium in the lithium bearing solution may be 0.1 g/L or more. More specifically, the concentration may be 0.2 g/L or more, or 0.5 g/L or more. The concentration of 60 g/L or more, however, may not be economical because a great amount of time is required for the high-enrichment of lithium.

In one embodiment of the present invention, the method may further comprise a step of extracting lithium phosphate by filtering the precipitated lithium phosphate from the lithium bearing solution.

In one embodiment of the present invention, the lithium bearing solution may be brine.

In one embodiment of the present invention, the brine may contain impurities including magnesium, boron, calcium, or a mixture thereof.

In one embodiment of the present invention, prior to precipitating lithium phosphate from dissolved lithium by adding a phosphorus supplying material in the brine, the method may further comprise a step of precipitating and removing impurities in the brine, including magnesium, boron, calcium, or a mixture thereof by adding a hydroxyl ion to the brine.

In one embodiment of the present invention, the step of precipitating lithium phosphate from dissolved lithium by adding a phosphorus supplying material may be performed at room temperature or higher.

In one embodiment of the present invention, the hydroxyl ion may be a negative ion of sodium hydroxide.

In one embodiment of the present invention, the step of precipitating and removing impurities in the brine, including magnesium, boron, calcium, or a mixture thereof by adding a hydroxyl ion to the brine may be a step of precipitating and removing impurities in the brine, including magnesium, boron and calcium, by adding a hydroxyl ion to the brine.

In one embodiment of the present invention, the step of precipitating and removing impurities in the brine, including magnesium, boron and calcium, by adding a hydroxyl ion to the brine may further comprise the steps of: (a) producing magnesium hydroxide from the magnesium by adding a hydroxyl ion to the brine; (b) adsorbing boron into the magnesium hydroxide to co-precipitate magnesium and boron and then extracting the magnesium and boron; and (c) precipitating calcium by adjusting the pH of the filtrate from which magnesium and boron are removed to be at least 12.

In one embodiment of the present invention, the step of producing magnesium hydroxide from the magnesium by adding a hydroxyl ion to the brine may be a step of producing magnesium hydroxide from the magnesium by adding a hydroxyl ion while maintaining the pH of the brine to be in the range of 8.5 to 10.5. The step of adsorbing boron into the magnesium hydroxide to co-precipitate magnesium and boron and then extracting the magnesium and boron may be performed by adding the boron to the brine including the magnesium hydroxide and having a pH ranging from 8.5 to 10.5 to co-precipitate the magnesium and boron and extracting the magnesium and boron. The step of producing magnesium hydroxide from the magnesium by adding a hydroxyl ion to the brine, while maintaining the pH of the brine to be in the range of 8.5 to 10.5 by adding a hydroxyl ion to the brine, and the step of adding the boron to the brine including the magnesium hydroxide and having a pH ranging from 8.5 to 10.5 to co-precipitate the magnesium and boron and extracting the magnesium and boron may be performed simultaneously.

In another embodiment of the present invention, the step of precipitating lithium phosphate from dissolved lithium by adding a phosphorus supplying material may be followed by a step of filtering the precipitated lithium phosphate and extracting it in the form of a high purity powder.

In yet another embodiment of the present invention, the step of precipitating calcium by adjusting the pH of the filtrate from which magnesium and boron are removed to be at least 12 may be a step of precipitating calcium hydroxide or calcium carbonate from calcium by adding hydroxyl ion, carbonate ion, or a mixture thereof.

In accordance with an embodiment of the present invention, without the processes of evaporation and concentration of brine for a long period of time, lithium dissolved in the brine may be economically extracted as lithium with high extraction yield by precipitation using lithium phosphate having low solubility.

DETAILED DESCRIPTION OF THE INVENTION

Figure 1:
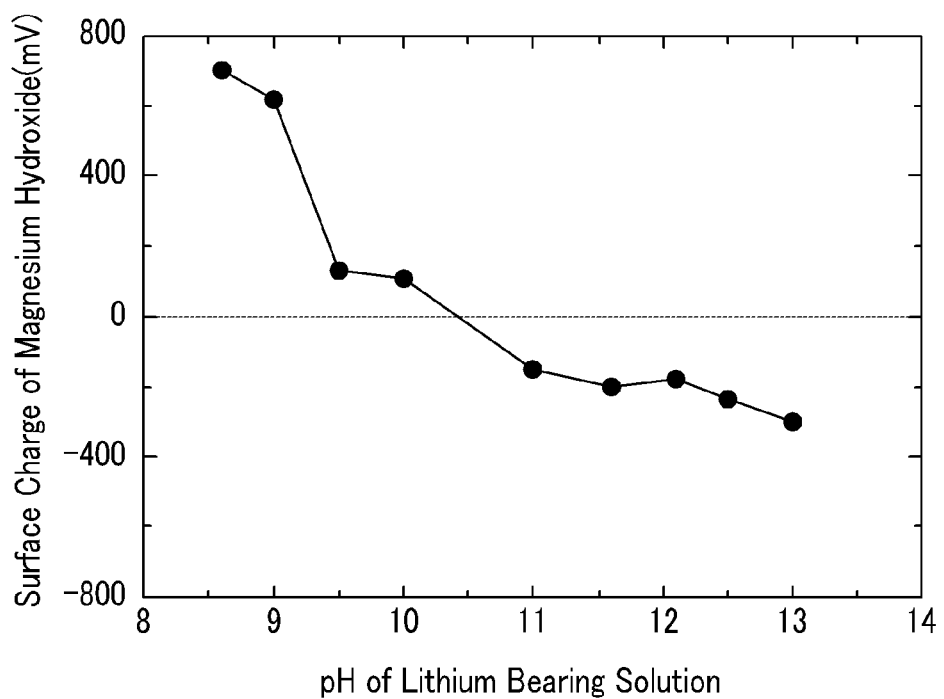
FIG. 1 is a graph depicting the surface charge change of magnesium hydroxide according to the pH of the brine.

The features of one embodiment of the present invention will be described in more detail with reference to the figures as follows.

In accordance with an embodiment of the present invention, a method of economical and efficient extraction of lithium from a lithium bearing solution by adding a phosphorus supplying material to the solution to precipitate lithium phosphate instead of lithium carbonate from the dissolved lithium may be provided.

Due to its solubility being approximately 13 g/L, a relatively large amount of lithium carbonate ($Li_2CO_3$) may be dissolved in the water. It is difficult to extract lithium from a lithium bearing solution, such as brine, because an extremely small concentration of lithium of 0.5 g/L to 1.5 g/L is dissolved. Even if lithium carbonate is produced by adding sodium carbonate to the lithium bearing solution, most of it re-dissolves.

The solubility of lithium phosphate ($Li_3PO_4$), however, is approximately 0.39 g/L, which is relatively lower than that of lithium carbonate. Accordingly, it is possible to extract even a small concentration of 0.5 g/L or 1.5 g/L of lithium dissolved in the lithium bearing solution, such as brine, which can be precipitated and separated into lithium phosphate in a solid state by adding a phosphorus supplying material in the lithium bearing solution.

In one embodiment of the present invention, the concentration of lithium in the lithium bearing solution may be 0.1 g/L or more. More specifically, the concentration may be 0.2 g/L or more, or 0.5 g/L or more. The concentration of 60 g/L or more, however, may not be economical because a great amount of time is required for the high-enrichment of lithium.

The phosphorus supplying material selected from the group consisting of phosphorous, phosphoric acid, phosphate, and a mixture thereof is added to the lithium bearing solution to produce lithium phosphate. In addition, in order for the lithium phosphate to be precipitated in a solid state without being re-dissolved, the concentration (i.e., the dissolved concentration in the lithium bearing solution) should be 0.39 g/L or greater.

In the case the phosphorus supplying material is a compound capable of altering the pH of the lithium bearing solution (e.g., phosphoric acid), hydroxide ions can be concurrently used to prevent the precipitated lithium phosphate from re-dissolving once the pH of the solution decreases.

The phosphate may be, for example, but is not limited thereto, potassium phosphate, sodium phosphate, and ammonium phosphate. Specifically, the ammonium may be $(NR_4)_3PO_4$, wherein R is independently a hydrogen, a heavy hydrogen, a substituted or unsubstituted C1-C10 alkyl group, but not limited thereto.

More specifically, the phosphate may be, for example, but is not limited thereto, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate.

The phosphorus supplying material may be water-soluble. In the case the phosphorous supplying material is water-soluble, the reaction with lithium contained in the lithium bearing solution may easily occur.

The precipitated lithium phosphate may be extracted by filtering the lithium bearing solution.

Further, the method of economical extraction of lithium from a lithium bearing solution by adding a phosphorus supplying material to the solution to precipitate lithium phosphate from the dissolved lithium may be performed at room temperature. More specifically, the temperature may be more than 20° C., 30° C., 50° C. or 90° C.

In the present invention, the term "room temperature" is not limited to a definite temperature, and it is construed to mean a temperature without the application of external energy. Accordingly, the room temperature may vary depending on time and place.

[Step of Removing Impurities Precipitates]

In accordance with an embodiment of the present invention, a step of removing impurities in the brine, including magnesium, boron or calcium, by adding a hydroxyl ion to a lithium bearing solution (e.g., brine) followed by precipitating may be included.

The hydroxyl ion may be, for example, but is not limited thereto, sodium hydroxide, potassium hydroxide, ammonium hydroxide. Specifically, the ammonium may be $(NR_4)_3OH$, wherein R is independently a hydrogen, a heavy hydrogen, a substituted or unsubstituted C1-C10 alkyl group, but is not limited thereto. More specifically, the hydroxide may be an anion of sodium hydroxide.

More specifically, the hydroxyl ion may be an anion of hydroxide salt produced as a by-product during the extraction of lithium, because the cation of hydroxide salt has high solubility.

In one embodiment of the present invention, the step of precipitating and removing impurities in the brine, including magnesium, boron or calcium, by adding a hydroxyl ion to the lithium bearing solution (e.g., brine, and hereinafter the solution is assumed to be brine) may be a step of precipitating and removing impurities in the brine, including magnesium, boron and calcium, by adding a hydroxyl ion to the brine.

In one embodiment of the present invention, the step of precipitating and removing impurities in the brine, including magnesium, boron or calcium, by adding a hydroxyl ion to the brine may further comprise the steps of: (a) producing magnesium hydroxide from the magnesium by adding a hydroxyl ion to the brine; (b) absorbing boron in the magnesium hydroxide to extract magnesium and boron by co-precipitating magnesium and boron; and (c) precipitating calcium by adjusting the pH of the filtrate from which magnesium and boron are removed to be at least 12.

Depending on the amount of magnesium, the step of (a) producing magnesium hydroxide from the magnesium by adding a hydroxyl ion to the brine and the step of (b) absorbing boron in the magnesium hydroxide to extract magnesium and boron by co-precipitating magnesium and boron may be performed individually or concurrently.

In other words, if a sufficient amount of magnesium hydroxide is produced and the produced magnesium hydroxide is capable of absorbing most of the boron, steps (a) and (b) may be performed simultaneously, whereas the steps may be performed separately if the amount of magnesium produced is insufficient.

In one embodiment of the present invention, for example, the magnesium may be produced as magnesium hydroxide by adding a hydroxyl ion (e.g., NaOH) to a lithium bearing brine including magnesium, boron, and calcium.

The pH of the brine with the added hydroxyl ion (e.g., NaOH) may be adjusted to be between 8.5 and 10.5 and subsequently, the co-precipitation of magnesium and boron may be possible by absorbing boron in the magnesium hydroxide.

The steps may be performed concurrently.

In order to elevate the pH of the brine to the range from 8.5 to 10.5, magnesium dissolved in the brine may be precipitated as magnesium hydroxide by adding a hydroxyl ion (e.g., NaOH). Magnesium hydroxide is characterized in having a low solubility of 0.009 g/L, and has a tendency to easily precipitate in a basic solution having a pH of 8 or higher.

In addition, by maintaining the pH of the brine to be between 8.5 and 10.5, boron (e.g., boron ions) may be absorbed on the surface of the produced magnesium hydroxide to co-precipitate magnesium and boron.

In this regard, the surface charge of the magnesium hydroxide can be utilized.

In general, the surface charge of the magnesium hydroxide is greatly influenced by the pH of the solution. When the surface charge of the magnesium hydroxide is positive, the boron ions existing in the form of a negative ion, such as $H_2BO_3^-$ or $HBO_3^{2-}$, are absorbed in the magnesium hydroxide, and the magnesium and boron dissolved in the lithium bearing solution can be removed by simultaneous extraction. When the surface charge of the magnesium hydroxide is negative, however, the negatively charged boron ions are not absorbed in the magnesium hydroxide.

If the pH of the brine is below 8.5, the removal efficiency of magnesium will decline because a relatively low pH results in an insufficient amount of precipitated magnesium hydroxide from magnesium ions dissolved in the brine. On the other hand, if the pH exceeds 10.5, as seen in FIG. 1, the surface charge of magnesium hydroxide would be negatively charged, and the boron ions cannot be absorbed thereon. Consequently, the absorbance of positively charged lithium ions present in the brine will lead to a substantial loss of lithium.

In order to simultaneously extract both magnesium and boron by precipitation, a hydroxyl ion (e.g., NaOH) may be added to the brine in phases, which allows the pH maintenance of the brine to be between 8.5 to 10.5.

An adequate amount of a hydroxyl ion (e.g., NaOH) is added to the brine having nearly a neutral pH to adjust the pH in the range between 8.5 and 10.5. This allows the absorbance of boron (e.g., boron ions) on the surface charge of the magnesium hydroxide to co-precipitate most of the magnesium and boron dissolved in the brine.

In order to additionally co-precipitate the remaining magnesium and boron existing in the filtrate after most of the magnesium and boron are precipitated, an additional hydroxyl ion (e.g., NaOH) may be added to the filtrate to adjust the pH to be between 8.5 and 10.5 and subsequently precipitate the remaining magnesium and boron.

It is preferable to add the hydroxyl ion (e.g., NaOH) in phases because if a large amount of the hydroxyl ion is added at once to precipitate magnesium and boron dissolved in the brine, the pH of the brine is not likely to be maintained at between 8.5 and 10.5, and thus the co-precipitation efficiency of magnesium and boron is likely to drop as well, resulting in the loss of lithium.

In order to separate the precipitated magnesium hydroxide absorbed with the boron from the brine, a filtration is performed to extract magnesium and boron simultaneously and to obtain the resulting filtrate.

Calcium may be precipitated by adding a hydroxyl ion or carbonate ion (e.g., NaOH, carbonate, or a mixture thereof) to the filtrate from which magnesium and boron are extracted to adjust the pH to be 12 or higher.

Depending on the types of hydroxyl ion or carbonate ion used, calcium hydroxide or carbonate hydroxide may be precipitated.

If the filtration step to separate the precipitated magnesium hydroxide absorbed with the boron from the brine is omitted, and the pH is adjusted to be 12 or higher to eliminate calcium, the surface charge of magnesium hydroxide would be converted to negative, because the pH of the brine deviates from the range of 8.5 and 10.5. In this case, the boron absorbed in the magnesium hydroxide will be desorbed, and instead, positive lithium ions will be absorbed, causing both the loss of lithium and a decrease in the boron extraction yield.

The calcium hydroxide and the calcium carbonate, having very low solubility, are easily precipitated when the pH is 12 or higher. Thus, it is preferable to maintain the pH of the filtrate to be 12 or higher.

In one embodiment of the present invention, for example, a mixture of an alkali and carbonate can be added.

The alkali is selected from the group consisting of NaOH, KOH, $Ca(OH)_2$, $NH_4OH$, $R_4NOH.5H_2O$ and a mixture thereof, wherein R is independently a C1-C10 alkyl group, such as, methyl, ethyl, propyl or butyl.

Since $OH^-$ supplied from the addition of the alkali (e.g., NaOH) is used up in the production of calcium hydroxide, a significant amount of alkali (e.g., NaOH) is added in order to maintain the pH level of the lithium bearing solution to be at least 12. When the calcium carbonate is added alone or in combination with the alkali (e.g., NaOH), the pH could be economically maintained to be at least 12 even if the amount of alkali could be relatively reduced.

The carbonate is selected from the group having high solubility consisting of $Na_2CO_3$, $K_2CO_3$, and a mixture thereof, and sodium and potassium included in the carbonate are dissolved in the filtrate. The precipitated calcium hydroxide or calcium carbonate is separated from the remaining filtrate, and subsequently calcium is extracted.

[Step of Precipitating Lithium Phosphate]

A phosphate supplying material may be added to the remaining filtrate from which the impurities are removed to precipitate lithium phosphate from lithium contained in the brine.

The step of precipitating lithium phosphate from the lithium bearing brine may be performed at room temperature or above, or at 40° C. or above. More specifically, the step may be performed at 50° C. or above, 60° C. or above, 70° C. or above, 80° C. or above, or 90° C. or above.

The phosphorus supplying material may be selected from the group consisting of phosphorous, phosphoric acid, phosphate, and a mixture thereof.

In order for the lithium phosphate to be precipitated in a solid state without being re-dissolved, the concentration (i.e., the dissolved concentration in the lithium bearing solution) should be 0.39 g/L or greater.

The phosphate may be, for example, but is not limited thereto, potassium phosphate, sodium phosphate, and ammonium phosphate. Specifically, the ammonium may be $(NR_4)_3PO_4$, wherein R is independently a hydrogen, a heavy hydrogen, a substituted or unsubstituted C1-C10 alkyl group, but not limited thereto.

More specifically, the phosphate may be, for example, but is not limited thereto, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate.

The phosphorus supplying material may be water-soluble. In the case the phosphorous supplying material is water-soluble, the reaction with lithium contained in the lithium bearing solution may easily occur.

Further, after the phosphorus supplying material is added, the filtrate is calcinated for 10 to 15 minutes at room temperature, or at a temperature range of 40-200° C., 50-200° C., 60-200° C., 70-200° C., 80-200° C., or 90-200° C.

Although it is advantageous to extend the calcining time and raise the temperature for the purpose of producing lithium phosphate, if the calcining time exceeds 15 minutes or if the calcining temperature exceeds 200° C., the production yield of lithium phosphate may be saturated.

[Step of Extracting Lithium Phosphate]

After precipitating lithium phosphate from lithium dissolved in the brine, the step of extracting the precipitated lithium phosphate filtered from the filtrate may be performed.

Upon such filtration, the extracted lithium phosphate may be washed to obtain high purity lithium phosphate powder.

The present invention is further illustrated by the following examples, although the following examples relate to preferred embodiments and are not to be construed as limiting on the scope of the invention.

EXAMPLE 1

NaOH was added to brine containing magnesium ions 20,000 ppm, boron ions 900 ppm, calcium ions 350 ppm, and lithium ions 900 ppm to precipitate magnesium hydroxide. While adjusting the pH of the brine, the surface charge of the precipitated magnesium hydroxide was measured. The results are shown in FIG. 1.

As shown in FIG. 1, the surface charge of the magnesium hydroxide was maintained with a positive charge when the pH range of the NaOH added brine was between 8.5 and 10.5.

Accordingly, the boron ions with a negative charge were easily absorbed on the magnesium hyrdroxide, and the positively charged lithium ions were prevented from being absorbed. This minimized the loss of lithium, and efficiently extracted both magnesium and boron from the brine at the same time.

EXAMPLE 2

While altering the pH, magnesium hydroxide was precipitated from the brine containing magnesium ions 20,000 ppm, boron ions 900 ppm, calcium ions 350 ppm, and lithium ions 900 ppm. Subsequently, a filtration was performed to separate the precipitated magnesium hydroxide from the brine. The filtrate was collected to measure the amount of magnesium, boron and lithium. The results are shown in FIGS. 2, 3, and 4, respectively.

Figure 2:
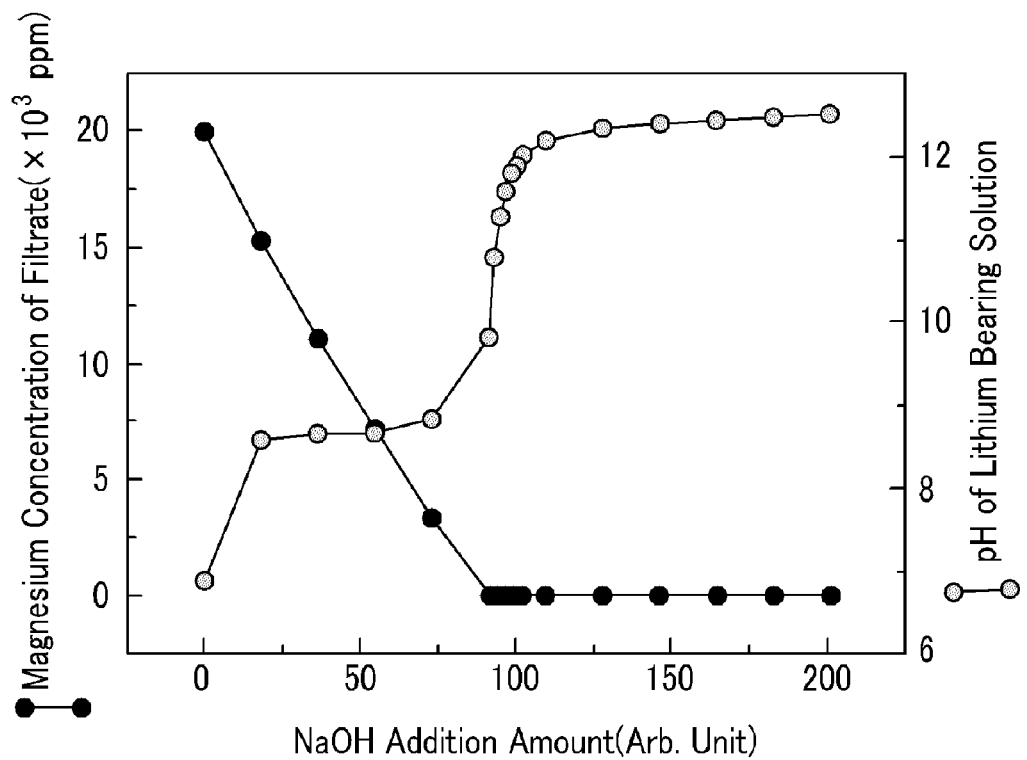
FIG. 2 is a graph depicting the concentration change of magnesium ions in the filtrate relative to the NaOH addition amount.

As shown in FIG. 2, an increase in the amount of NaOH added had no significant impact on the pH of the brine in the beginning, because OFF ion was used for the production of magnesium hydroxide. However, a continuous increase in the amount of NaOH gradually decreased the magnesium amount in the filtrate, and as the OFF ion increased, the amount of magnesium decreased to 4 ppm once the pH of the brine reached 9.8. This indicated that 99.8% of the magnesium ions dissolved in the brine were extracted.

Figure 3:
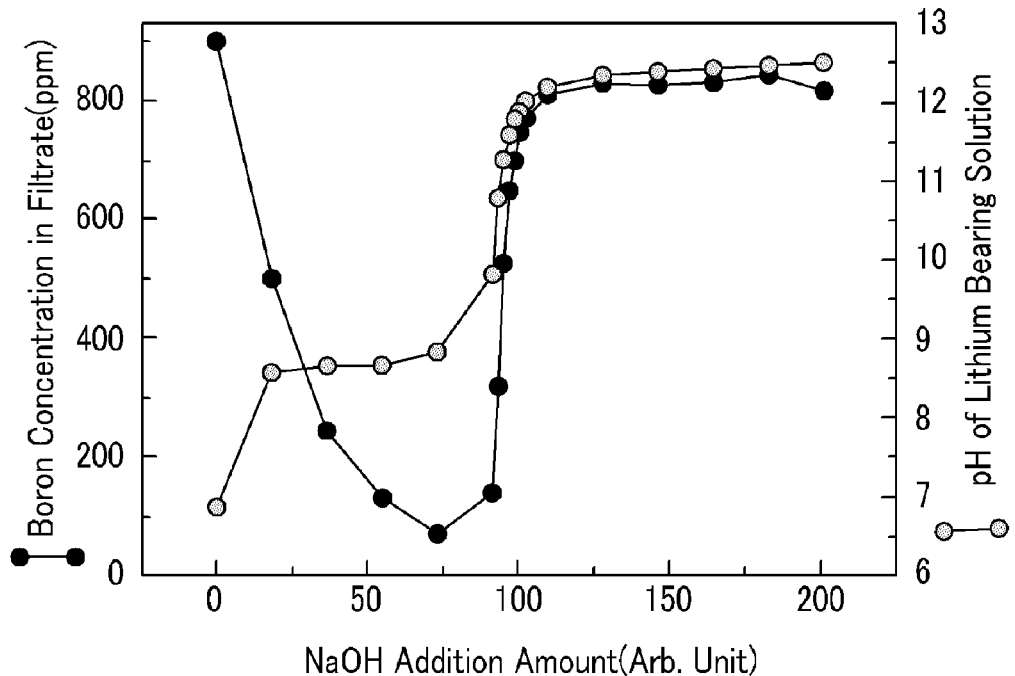
FIG. 3 is a graph depicting the concentration change of boron ions in the filtrate relative to the NaOH addition amount.

In addition, as shown in FIG. 3, the amount of boron ions dissolved in the brine initially decreased as the amount of NaOH added increased. This may be explained by the fact that the pH change could be insignificantly affected by the addition of NaOH in the beginning, and the surface charge of the magnesium hydroxide precipitated from the brine having a pH value of 10.5 or lower had a positive charge. Thus, the negatively charged boron ions present in the filtrate were precipitated while adsorbed on the surface of the magnesium hydroxide.

Figure 4:
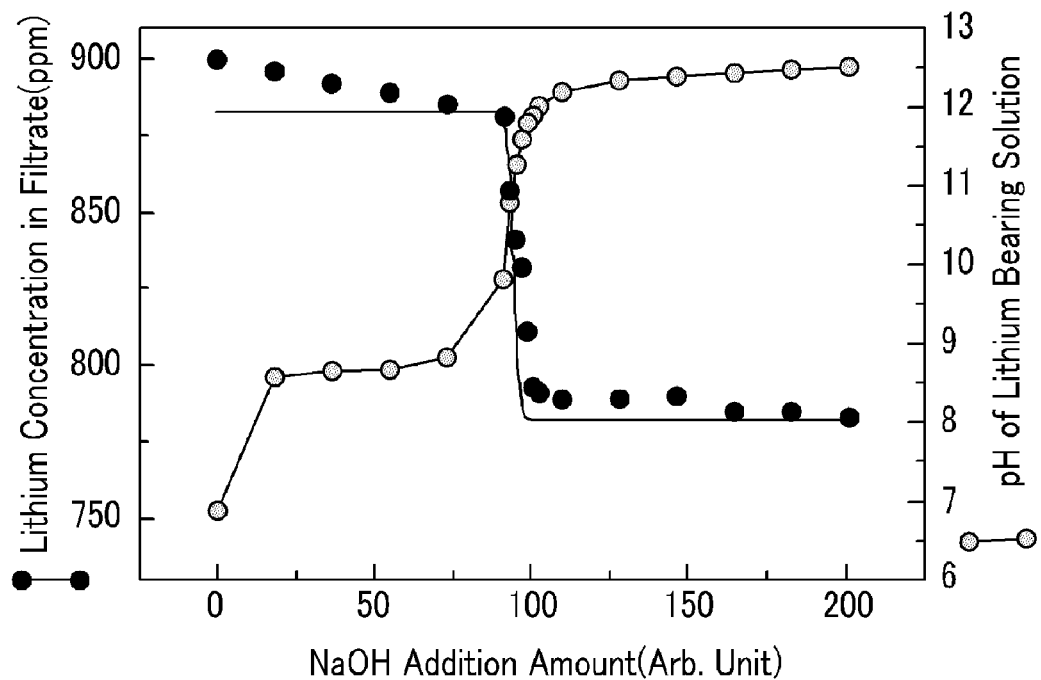
FIG. 4 is a graph depicting the concentration change of lithium ions in the filtrate relative to the NaOH addition amount.

As seen in FIG. 4, the amount of lithium ions present in the filtrate were initially not influenced by the added amount of NaOH. This could be explained by the fact that the positively charged lithium ions existing in the lithium bearing solution were not absorbed in the magnesium hydroxide because the surface charge of magnesium hydroxide had a positive charge in the beginning. If an excessive amount of NaOH was added, however, the pH of the brine surpassed 10.5. Then, the surface charge of the magnesium hydroxide was converted to a negative charge and the negatively charged boron ions were not absorbed to the surface. Consequently, the concentration of boron ions existing in the filtrate dramatically increased. On the contrary, the concentration of positively charged lithium ions existing in the filtrate rapidly decreased as the lithium ions were absorbed to the surface of the magnesium hydroxide.

Accordingly, these results indicate that the added amount of NaOH must be controlled to maintain the pH of the brine to be between 8.5 and 10.5 in order to extract magnesium and boron simultaneously, while minimizing the loss of lithium from the brine.

EXAMPLE 3

NaOH was added to the brine containing magnesium ions 20,000 ppm, boron ions 900 ppm, calcium ions 350 ppm, and lithium ions 900 ppm to precipitate calcium hydroxide from the solution containing calcium ions. Subsequently, a filtration was performed to separate the precipitated calcium hydroxide from the brine. The resulting filtrate was collected to measure the amount of calcium. The result is shown in FIG. 5.

Figure 5:
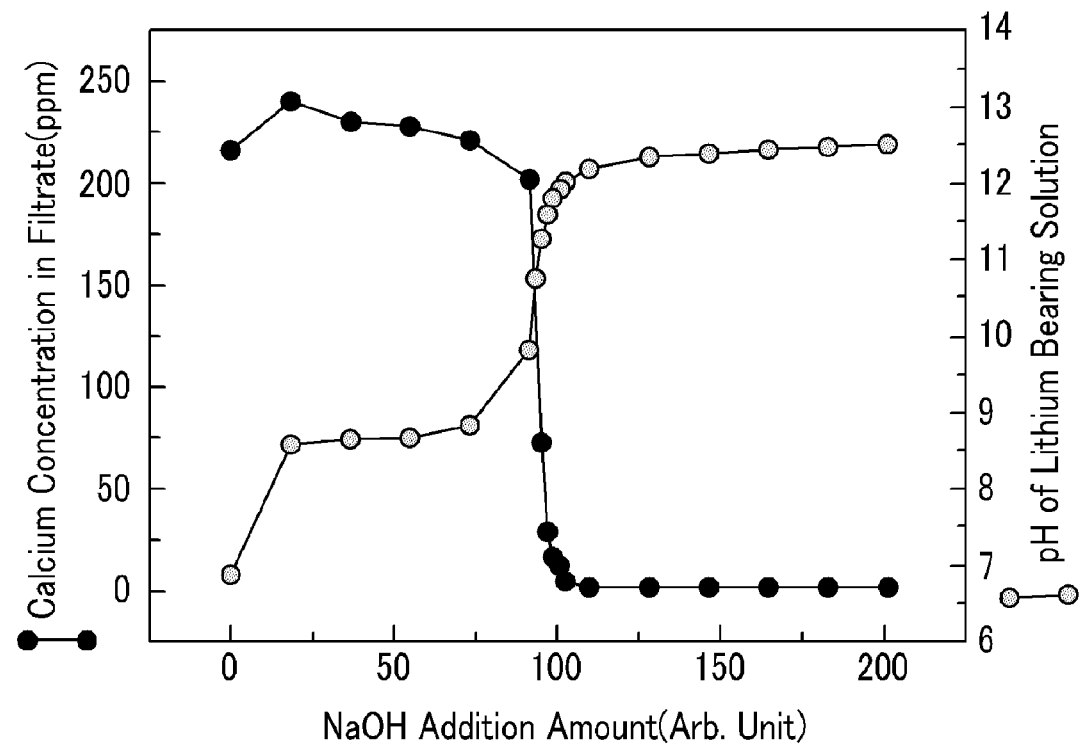
FIG. 5 is a graph depicting the concentration change of calcium ions in the filtrate relative to the NaOH addition amount.

As shown in FIG. 5, as the added amount of NaOH increased, the amount of calcium in the filtrate gradually decreased. When the pH of the brine reached 12, the amount of calcium was reduced to be 6.5 ppm, and 98% of the calcium ions dissolved in the brine was extracted. Accordingly, it is preferable to increase the pH of the lithium bearing solution to be at least 12 in order to enhance the extract yield of the calcium ions from the brine.

However, when the pH of the brine was prematurely adjusted to be at least 12 in the beginning, the surface charge of the precipitated magnesium hydroxide had a negative charge. This prevented the absorbance of the boron ions and caused the loss of lithium due to the absorbance of positively charged lithium ions. Prior to extracting calcium by adding NaOH, the pH of the brine was adjusted to be between 8.5 and 10.5 so that the magnesium hydroxide having a positive charge was precipitated to prevent the absorbance of the lithium ions. Once the boron ions were absorbed, the simultaneous extraction of magnesium and boron was performed. Then, the pH of the remaining filtrate from which magnesium and boron were extracted was adjusted to be at least 12 to precipitate the calcium hydroxide from calcium.

EXAMPLE 4

The impurities, including magnesium, calcium and boron, were removed from the brine, and 7.217 g/L of sodium phosphate was added to the remaining filtrate dissolved with the concentration of lithium ions being 0.917 g/L. The filtrate was maintained to be reacted for 15 to 60 minutes, while elevating the temperature to 90° C.

Once the reaction was completed, the precipitated lithium phosphate was separated by filtering, and the remaining filtrate was collected to measure the concentration of lithium. The result is shown in FIG. 6.

Figure 6:
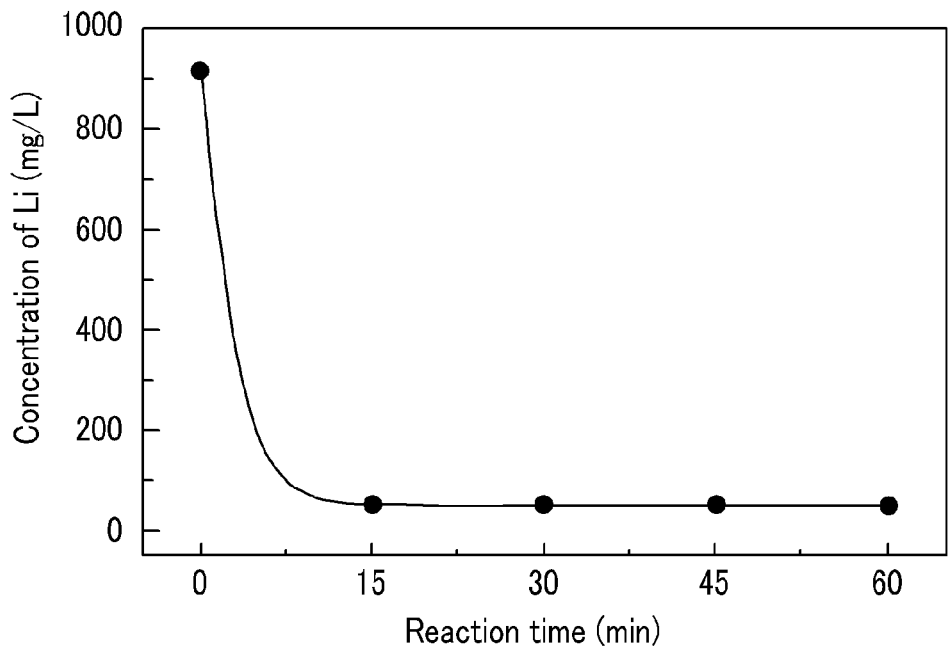
FIG. 6 is a graph depicting the concentration of lithium relative to the reaction time when lithium phosphate is precipitated from lithium.

As shown in FIG. 6, the concentration of lithium in the filtrate initially decreased dramatically when sodium phosphate was added to the brine. After the reaction time passed 15 minutes, the concentration of lithium in the filtrate came to be below 50 mg/L. This indicated that more than 95% of lithium dissolved in the brine was precipitated and separated as lithium phosphate.

Figure 7:
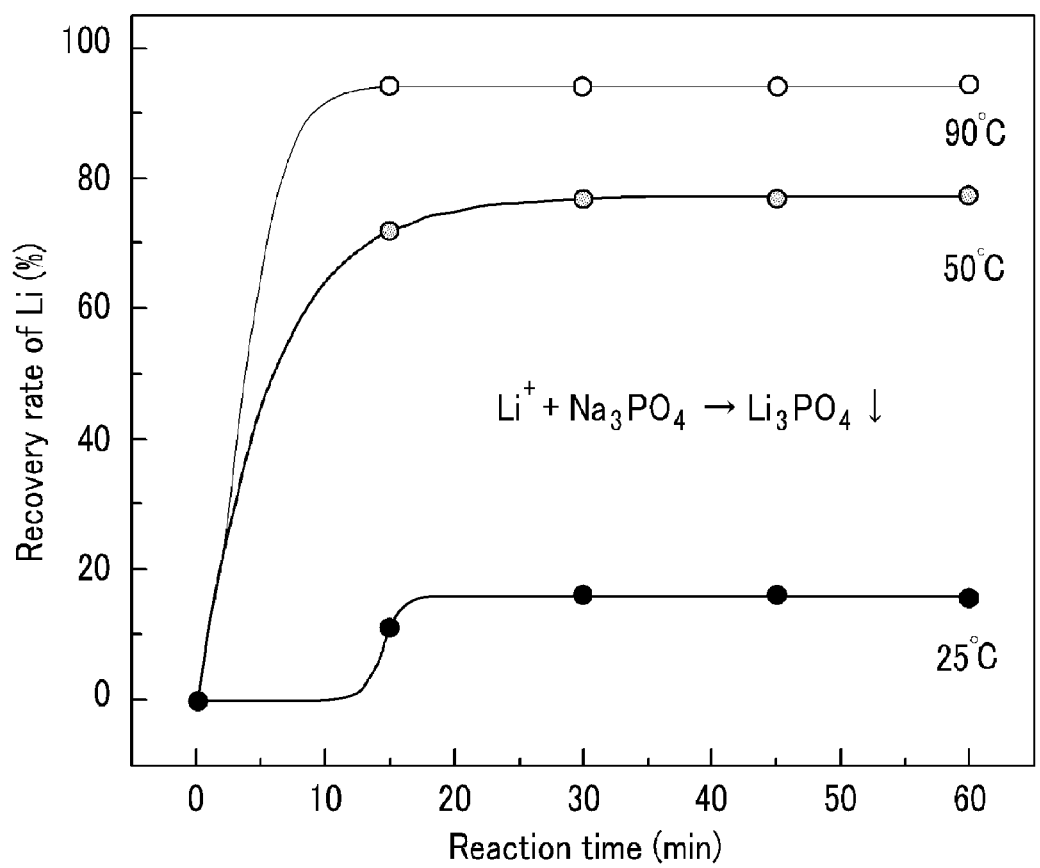
FIG. 7 is a graph depicting the concentration of lithium relative to the reaction time and temperature when lithium phosphate is precipitated from lithium.

Since the solubility of lithium phosphate is approximately 0.39 g/L, which is much lower than the solubility of lithium carbonate, adding a material including phosphorus, such as sodium phosphate, in the brine precipitated lithium phosphate in the form of solid from a small amount of lithium dissolved in the brine. In addition, as can be seen in FIG. 7, if the calcining temperature exceeded 90° C., the lithium extraction yield was more than 90% after the reaction time of 10 minutes, and the yield was more than 95% after 15 minutes.

Comparative Example 1

The impurities, including magnesium, calcium and boron, were removed from the brine, and 7 g/L of sodium carbonate was added to the remaining filtrate dissolved with the concentration of lithium ions being 0.917 g/L. The filtrate was maintained to be reacted for 15 to 60 minutes, while elevating the temperature to 90° C.

Once the reaction was completed, the precipitated lithium carbonate was separated by filtering, and the remaining filtrate was collected to measure the concentration of lithium. The result is shown in FIG. 8.

Figure 8:
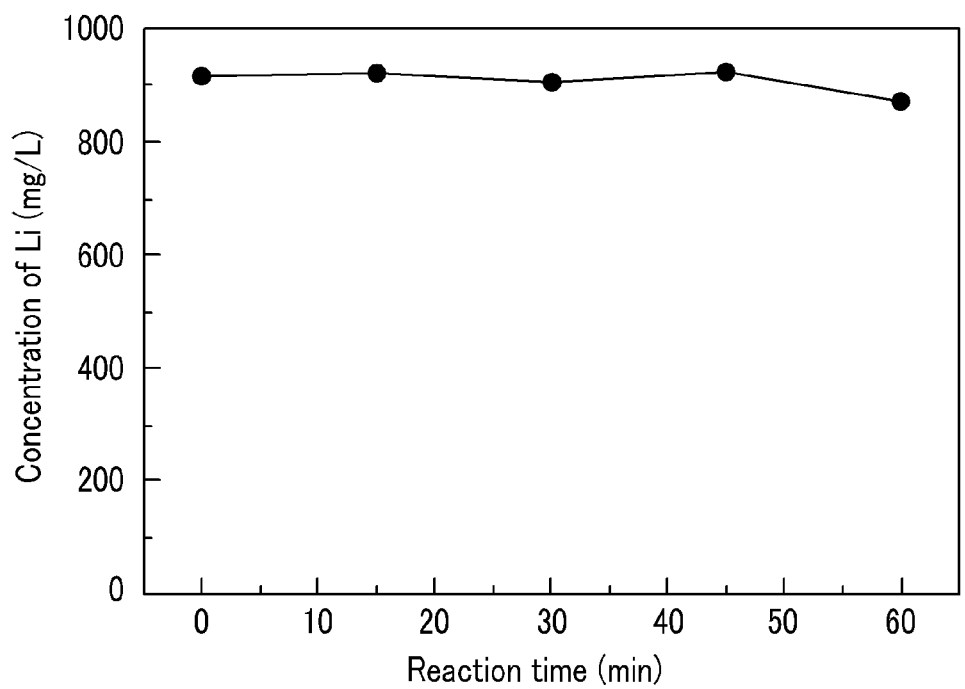
FIG. 8 is a graph depicting the concentration of lithium phosphate in the filtrate relative to the reaction time when lithium carbonate is precipitated from lithium.

As shown in FIG. 8, even if sodium carbonate was added to the lithium bearing solution, and reacted for 15 to 60 minutes, the concentration of lithium in the filtrate was almost identical to the concentration of lithium in the brine prior to the reaction.

In other words, due to its high solubility of approximately 13 g/L, a large amount of lithium carbonate can be dissolved in the water. Therefore, it would be extremely difficult to extract a small amount of lithium dissolved in the brine in the form of lithium carbonate, unless the precipitation amount of lithium carbonate is increased by evaporation and concentration of the brine.

By precipitating lithium dissolved in the brine by using lithium phosphate having a low solubility, the processes of evaporation as well as concentration of brine are not required, and the economical extraction of lithium with high extraction yield, while minimizing the loss of lithium, may be possible.

In the foregoing specification, specific embodiments of the present invention have been described. However, one of ordinary skill in the art will appreciate that various modifications and changes can be made without departing from the spirit and scope of the present invention as set forth in the various embodiments discussed above. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements as described herein.

What is claimed is:

1. A method for extraction of lithium from a lithium bearing solution by adding a phosphorus supplying material to the lithium bearing solution to precipitate lithium phosphate from the lithium bearing solution, and wherein the lithium bearing solution is brine.

2. The method according to claim 1, wherein the phosphorus supplying material is one selected from the group consisting of phosphorus, phosphoric acid, phosphate, and a mixture thereof.

3. The method according to claim 1, wherein the total concentration of the lithium phosphate in brine is 0.39 g/L or more.

4. The method according to claim 1, wherein the concentration of lithium in the lithium bearing solution is 0.1 g/L to 1.5 g/L.

5. The method according to claim 1, wherein the method further comprises a step of removing impurities in the brine prior to precipitating lithium phosphate from the lithium bearing solution by adding the phosphorus supplying material.

6. The method according to claim 5, wherein the impurities comprise magnesium, boron, calcium or a mixture thereof.

7. The method according to claim 6, wherein the method further comprises a step of precipitating and removing impurities in the brine, including magnesium, boron, calcium or a mixture thereof by adding a hydroxyl ion to the brine prior to precipitating lithium phosphate from the lithium bearing solution by adding a phosphorus supplying material to the brine.

8. The method according to claim 7, wherein the hydroxyl ion is a negative ion of sodium hydroxide.

9. The method according to claim 7, wherein the step of precipitating and removing impurities in the brine, including magnesium, boron, calcium, or a mixture thereof by adding a hydroxyl ion to the brine is a step of precipitating and removing impurities in the brine, including magnesium, boron and calcium, by adding a hydroxyl ion to the brine.

10. The method according to claim 9, wherein the step of precipitating and removing impurities in the brine, including magnesium, boron and calcium, by adding a hydroxyl ion to the brine further comprises the steps of:
(a) producing magnesium hydroxide from the magnesium by adding a hydroxyl ion to the brine;
(b) adsorbing boron into the magnesium hydroxide to co-precipitate magnesium and boron and then extracting the magnesium and boron; and
(c) precipitating calcium by adjusting the pH of the brine from which magnesium and boron are removed to be at least 12.

11. The method according to claim 10, wherein the step of producing magnesium hydroxide from the magnesium by adding a hydroxyl ion to the brine is a step of producing magnesium hydroxide from the magnesium by adding a hydroxyl ion while maintaining the pH of the brine to be in the range of 8.5 to 10.5,
the step of adsorbing boron into the magnesium hydroxide to co-precipitate magnesium and boron and then extracting the magnesium and boron is a step of adding the boron to the brine including the magnesium hydroxide and having a pH ranging from 8.5 to 10.5 to co-precipitate the magnesium and boron and extracting the magnesium and boron and
the step of producing magnesium hydroxide from the magnesium by adding a hydroxyl ion to the brine, while maintaining the pH of the brine to be in the range of 8.5 to 10.5 by adding a hydroxyl ion into the brine, and the step of adsorbing the boron into the brine including the magnesium hydroxide and having a pH ranging from 8.5 to 10.5 to co-precipitate the magnesium and boron and extracting the magnesium and boron are performed simultaneously.

12. The method according to claim 10, wherein the step of precipitating calcium by adjusting the pH of the brine from which magnesium and boron are removed to be at least 12 is a step of precipitating calcium hydroxide or calcium carbonate from the brine from which magnesium and boron are removed by adding hydroxyl ion, carbonate ion, or a mixture thereof.

13. The method according to claim 7, wherein the step of precipitating lithium phosphate from the lithium bearing solution by adding a phosphorus supplying material is followed by a step of filtering the precipitated lithium phosphate and extracting it in the form of a high purity powder.

14. The method according to claim 1, wherein the step of precipitating lithium phosphate from the lithium bearing solution by adding a phosphorus supplying material is performed at room temperature or higher.

15. The method according to claim 1, wherein the step of precipitating lithium phosphate from the lithium bearing solution by adding a phosphorus supplying material is performed at 90° C. or higher.

* * * * *